US008420975B2

(12) United States Patent
Yamaguchi et al.

(10) Patent No.: US 8,420,975 B2
(45) Date of Patent: Apr. 16, 2013

(54) PLASMA TORCH, PLASMA TORCH NOZZLE, AND PLASMA-WORKING MACHINE

(75) Inventors: Yoshihiro Yamaguchi, Kaga (JP); Kazuhiro Kuraoka, Hakusan (JP)

(73) Assignee: Komatsu Industries Corp., Ishikawa (JP)

( * ) Notice: Subject to any disclaimer, the term of this patent is extended or adjusted under 35 U.S.C. 154(b) by 776 days.

(21) Appl. No.: 12/600,616

(22) PCT Filed: Jun. 27, 2008

(86) PCT No.: PCT/JP2008/061760
§ 371 (c)(1), (2), (4) Date: Nov. 17, 2009

(87) PCT Pub. No.: WO2009/008271
PCT Pub. Date: Jan. 15, 2009

(65) Prior Publication Data

US 2010/0155373 A1 Jun. 24, 2010

(30) Foreign Application Priority Data

Jul. 12, 2007 (JP) ................................ 2007-183558

(51) Int. Cl.
*B23K 10/00* (2006.01)

(52) U.S. Cl.
USPC .................................. 219/121.5; 219/121.48

(58) Field of Classification Search ............... 219/121.5, 219/121.48
See application file for complete search history.

(56) References Cited

U.S. PATENT DOCUMENTS

| | | | | |
|---|---|---|---|---|
| 4,929,811 | A * | 5/1990 | Blankenship | 219/121.54 |
| 6,268,583 | B1 * | 7/2001 | Yamaguchi et al. | 219/121.52 |
| 6,914,211 | B2 * | 7/2005 | Brasseur et al. | 219/121.5 |

FOREIGN PATENT DOCUMENTS

| | | | | |
|---|---|---|---|---|
| JP | 1-284482 | A | | 11/1989 |
| JP | 3-114678 | A | | 5/1991 |
| JP | 6-262366 | A | | 9/1994 |
| JP | 11-221675 | A | | 8/1999 |
| JP | 2000-334570 | A | | 12/2000 |
| JP | 2001-252770 | A | | 9/2001 |
| JP | 2001252770 | A | * | 9/2001 |
| JP | 2002-45971 | A | | 2/2002 |
| JP | 2005-46913 | A | | 2/2005 |
| JP | 2005046913 | A | * | 2/2005 |

* cited by examiner

*Primary Examiner* — Long Tran
*Assistant Examiner* — Jordan Klein
(74) *Attorney, Agent, or Firm* — Global IP Counselors, LLP

(57) ABSTRACT

A plasma torch includes a torch main unit and a nozzle. The torch main unit has a nozzle seat member on which the nozzle is mounted. The nozzle is arranged to move toward or away from the nozzle seat member in a direction substantially parallel to a center axis of the nozzle when the nozzle is mounted on or removed from the nozzle seat member. The nozzle has an electroconductive surface facing the nozzle seat member. The torch main unit has an elastic electric contact portion contacting with the electroconductive surface of the nozzle to form an electroconductive path for a pilot arc to the nozzle. The electroconductive surface of the nozzle presses the electric contact portion in the direction substantially parallel to the center axis when the nozzle is moved toward the nozzle seat member to mount the nozzle on the nozzle seat member.

12 Claims, 7 Drawing Sheets

PLASMA TORCH, PLASMA TORCH NOZZLE, AND PLASMA-WORKING MACHINE

CROSS-REFERENCE TO RELATED APPLICATIONS

This national phase application claims priority to Japanese Patent Application No. 2007-183558, filed on Jul. 12, 2007. The entire disclosure of Japanese Patent Application No. 2007-183558 is hereby incorporated herein by reference.

TECHNICAL FIELD

The present invention generally relates to a plasma-working machine such as a plasma cutter, and particularly relates to a plasma torch thereof, and to the structure of the nozzle thereof.

BACKGROUND ART

A plasma torch generates an electrical discharge referred to as a pilot arc between an electrode and a nozzle inside a torch, moves the pilot arc, and establishes a plasma arc, which is an electrical discharge between a workpiece and an electrode for cutting the workpiece, when cutting or other work is started. An electroconductive path for generating the pilot arc extends inside the torch from the torch main unit to the nozzle.

A typical example of a conventional structure of an electroconductive path is disclosed in Japanese Laid-open Patent Application No. 11-221675, in which a cap (referred to as an inner cap in the publication) is used for mounting the nozzle on the torch main unit. The nozzle is held at the distal end of the inner cap, and the base end of the inner cap is threaded onto the torch main unit. The distal end of the inner cap has a metal surface that is in direct contact with the nozzle. Such an inner cap and screw of the torch main unit form an electroconductive path that extends from the torch main unit to the nozzle.

Japanese Laid-open Patent Application No. 2000-334570 discloses a plasma torch in which an electroconductive path having a different structure than that described above is used. In this torch, a cap (referred to in the publication as a retaining cap) for mounting the nozzle on the torch main unit is electrically insulated from the nozzle and does not form an electroconductive path. The electroconductive path is formed instead by a nozzle seat made of metal inside the torch main unit. When the nozzle is mounted on the torch main unit with the aid of the retaining cap, the base end surface of the nozzle is pressed against and makes contact with the distal end surface of the nozzle seat to form an electrical connection between the nozzle and the nozzle seat. Furthermore, a plurality of elastic electrical connection terminals provided to the front end part of the nozzle seat makes contact with the external surface of the base end of the nozzle by way of a strong elastic force directed toward the center of the nozzle. The electrical connection terminals sandwich the nozzle from the outside and an electrical connection is formed between the nozzle and the nozzle seat.

SUMMARY

According to the disclosure of Japanese Laid-open Patent Application No. 2000-334570, the electroconductive path to the nozzle is formed by the following two types of contact. The first type is contact that occurs between the base end surface of the nozzle and the distal end surface of the nozzle seat when the retaining cap presses the nozzle against the nozzle seat. The second type is contact that occurs between the electrical connection terminal and the external surface of the nozzle due to the strong elastic force of the plurality of electrical connection terminals.

However, the first type of contact has the following problem. An O-ring that provides a water/gas seal for keeping apart the coolant channel outside the nozzle and the plasma gas channel inside the nozzle is sandwiched between the base end surface of the nozzle and the distal end surface of the nozzle seat. The reaction force when the O-ring is compressed reduces the force that presses the nozzle against the nozzle seat, and interferes with the formation of a reliable electroconductive path. Therefore, the contact resistance between the nozzle and the nozzle seat may be increased, and the contact surface between the two may be melted by sparks generated by poor contact. Since the electrical insulation is more readily damaged in air than in water, sparks more readily occur between the nozzle and the nozzle seat on the gas channel side than in the coolant channel side. The torch main unit, which is not usually an expendable part, is damaged when such a spark occurs.

The second type of contact has the following problem in relation to contact with the external surface of the nozzle of the elastic electric contacts. The role of the second type of contact is to compensate for the problem described above in the case of the first type of contact. The elastic force of the electric contacts is sufficiently strong and the nozzle is held with a strong force directed from the exterior in order to reliably form an electroconductive path between the elastic electric contacts and the side surface of the nozzle, i.e., in order to provide sufficient contact surface pressure. It is not easy for the user to remove the nozzle by hand in a simple manner because of this strong holding force when the nozzle is to be replaced. The direction of the pressing force from the electric contacts applied to the external surface of the nozzle is the direction facing the center axis of the nozzle. Therefore, the center axis of the nozzle may become misaligned from the correct position (typically, the center axis position of the torch) due to the unbalanced elastic force of the plurality of electric contacts.

Therefore, an object of the present invention is to more reliably form an electroconductive path for the pilot arc to the nozzle.

Another object of the present invention is to further facilitate the removal of the nozzle when the nozzle is replaced.

Yet another object of the present invention is to further facilitate the restoration from damage even if the components have melted due to poor contact between the electroconductive path and the nozzle.

Yet another object of the present invention is to prevent the electroconductive path from interfering with the positioning of the center axis of the nozzle.

A plasma torch provided according to a first aspect comprises a torch main unit having a nozzle seat member, and a nozzle mounted on the nozzle seat member. The nozzle is arranged to move toward the nozzle seat member or away from the nozzle seat member in a direction substantially parallel to a center axis of the nozzle when the nozzle is mounted on or removed from the nozzle seat member. The nozzle has an electroconductive surface facing the nozzle seat member. The torch main unit has an elastic electric contact portion contacting with the electroconductive surface of the nozzle to form an electroconductive path for a pilot arc to the nozzle. The torch main unit and the nozzle are arranged such that the electroconductive surface of the nozzle presses the electric contact portion of the torch main unit in the direction substantially parallel to the center axis of the nozzle when the nozzle is moved toward the nozzle seat member in order to mount the nozzle on the nozzle seat member.

According to the plasma torch of the aspects described above, the electric contact portion of the torch main unit make contact with the electroconductive surface of the nozzle and are pressed against the electroconductive surface of the nozzle by the elastic force of the electric contact portion in a state in which the nozzle is mounted on the nozzle seat member of the torch main unit. The electroconductive surface of the nozzle faces the nozzle seat member, and the electroconductive surface of the electric contact portion press in the direction in which the nozzle is pressed away from the nozzle seat member substantially parallel to the center axis of the nozzle. Therefore, in a state in which the nozzle is mounted on the torch main unit, the contact force between the nozzle and the electric contact portion is sufficiently great, good electric contact is assured between the nozzle and the electric contact portion, and the electroconductive path for the pilot arc to the nozzle is reliably formed. Also, when the user attempts to remove the nozzle from the nozzle seat member, the nozzle is readily removed because the electric contact portion acts to push the nozzle from the nozzle seat member.

In the plasma torch according to yet another aspect, a contact location between the electroconductive surface of the nozzle and an electroconductive surface of the electric contact portion is disposed inside a coolant channel through which coolant flows. Accordingly, a spark is unlikely to be generated due to damage to the electrical insulation, and damage from sparking can be reduced in the case that poor contact occurs in the contact location between the electroconductive surface of the nozzle and the electric contact portion because the contact location is within the coolant.

In the plasma torch according to yet another aspect, the electric contact portion is arranged to be removal from the torch main unit. It is possible to replace only the electric contact portion in the case that electric contact portion has been damaged by sparks, thereby facilitating restoration from damage.

In the plasma torch according to yet another aspect, the nozzle has an outer flange provided substantially about the entire periphery of the center axis on the external surface of the nozzle, and the outer flange includes the electroconductive surface. When the nozzle is pressed into the nozzle seat member in order to mount the nozzle on the torch main unit, a location on the outer flange of the nozzle makes contact with the electric contact portion of the torch main unit, and an electroconductive path is reliably formed even when the rotational position about the center axis of the nozzle assumes any position in relation to the nozzle seat member. Therefore, the nozzle, the nozzle seat member, and the electric contact portion are not required to be positioned in the rotational direction when the user mounts the nozzle on the torch main unit. Also, the flange increases the external surface area of the nozzle and improves the cooling effect of the nozzle.

In the plasma torch according to yet another aspect of the present invention, the electroconductive surface of the nozzle and the electric contact portion forms an exclusive electrical connection between the nozzle and the electroconductive path for the pilot arc. An electric connection between the nozzle and the electroconductive path for the pilot arc does not exist other than at the contact location between the electroconductive surface of the nozzle and the electric contact portion. Therefore, other locations, more particularly, locations other than the electric contact portion of the torch main unit (i.e., locations for which replacement is not readily carried out) are not damaged by sparks in the case that sparks are generated due to poor contact. The force applied by the electroconductive path to the nozzle is only the pressing force from the electric contact portion, the direction of the force is substantially parallel to the center axis of the nozzle, and the force therefore is not a cause of lateral displacement of the center axis of the nozzle.

A nozzle according to yet another aspect is adapted to be installed in the plasma torch described above. A plasma-working machine (e.g., a plasma cutter) according to yet another aspect has the plasma torch described above.

According to the aspects described above, an electroconductive path for a pilot arc is reliably formed. Also, according to the aspects described above, the nozzle can be readily removed when the nozzle is to be replaced because the electric contact portion generates a force that pushes the nozzle outward from the torch main unit.

In an aspect of the present invention, restoration is readily achieved because the components that can be damaged are the nozzle and the electric contact portion, and one or both can be replaced when poor contact occurs in a case that the electric contact portion can be removed from the torch main unit. Also, in an aspect of the present invention, only the contact between the nozzle and the electric contact portion provides an electrical connection between the nozzle and the electroconductive path for a pilot arc. The force that the electroconductive path applies to the nozzle is merely the pressing force from the electric contact portion, and since the force is substantially parallel to the center axis of the nozzle, the force does not interfere with the positioning of the center axis of the nozzle.

A nozzle according to yet another aspect adapted to be installed in a plasma torch and includes a first cylindrical part, an outer flange, and a second cylindrical part. The outer flange has an electroconductive surface protruding from the external peripheral surface of the first cylindrical part in the radial direction. The outer flange is disposed adjacent to the first cylindrical part in the axial direction, and has a greater outer diameter than the first cylindrical part. The second cylindrical part is disposed adjacent to the outer flange in the axial direction, has a knurled pattern formed on the external peripheral surface, and has a smaller outer diameter than the outer flange. When this nozzle is incorporated into a plasma torch, the electric contact portion provided in the torch main unit makes contact with the electroconductive surface of the nozzle and press against the electroconductive surface of the nozzle due to the elastic force of the electric contact portion. In this case, the pressing force from the electric contact portion acts on the electroconductive surface in a direction substantially parallel to the center axis of the nozzle because the electroconductive surface protrudes in the radial direction from the external peripheral surface of the first cylindrical part. Accordingly, the center axis of the nozzle is unlikely to become offset from the correct position, even when the elastic force of the electric contact portion is nonuniform. The electroconductive path for the pilot arc to the nozzle can thereby be more reliably formed. With the nozzle, a large-diameter flange is provided to thereby increase the surface area of the nozzle. Furthermore, a knurled pattern is formed on the external peripheral surface of the second cylindrical part, whereby the surface area of the nozzle is increased. Therefore, the cooling effect of the nozzle can be improved.

DETAILED DESCRIPTION OF THE EMBODIMENTS

An embodiment of the present invention is described below with reference to the drawings.

Figure 1:
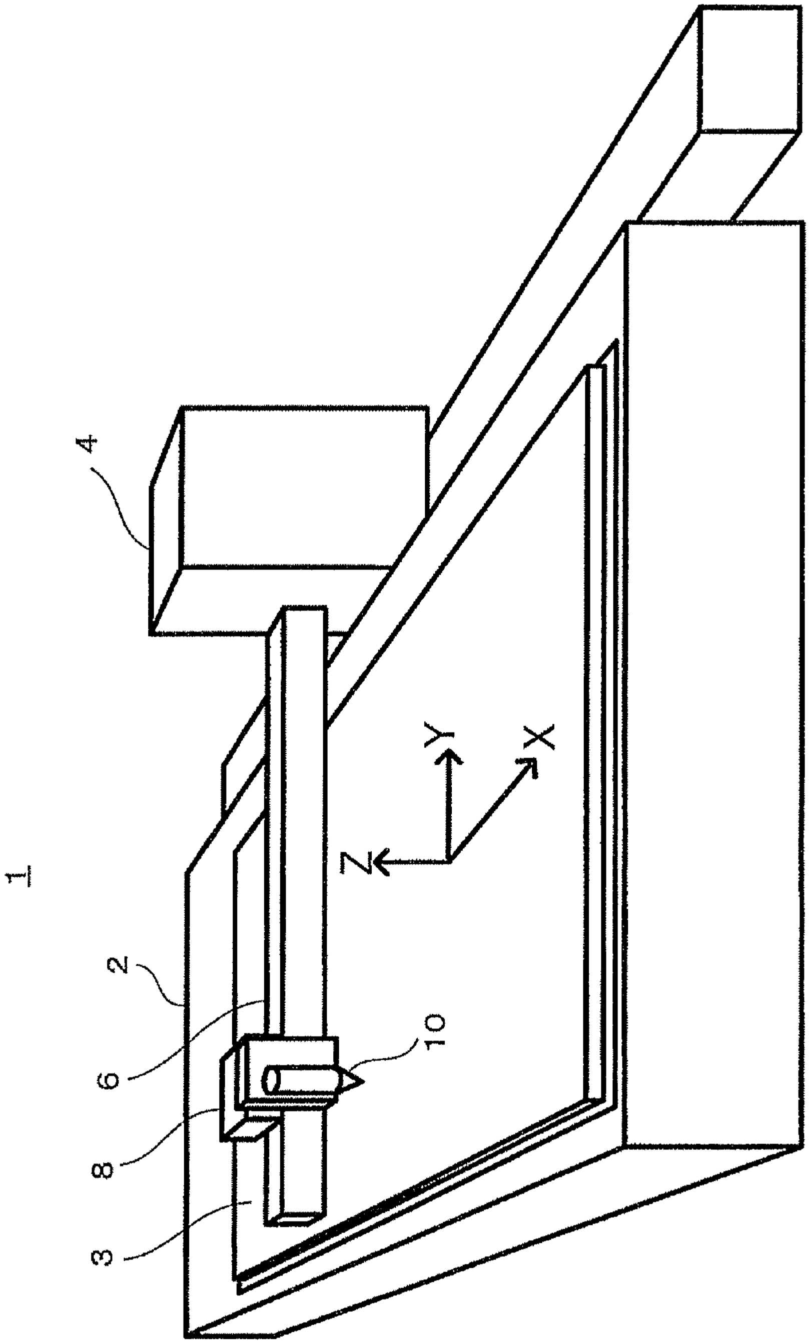
FIG. 1 is a perspective view showing in a simplified manner the overall configuration of an embodiment of the plasma-working machine according to the present invention.

FIG. 1 shows in a simplified manner the overall configuration of an embodiment of the plasma-working machine according to the present invention.

A plasma-working machine (e.g., a plasma cutter) 1 is provided with a table 2 on which a workpiece (typically, a steel plate) 3 is arranged; a plasma torch 10 for emitting a plasma arc and working (e.g., cutting) a workpiece 3; torch movement devices 4, 6, 8 for moving the plasma torch 10 in the X (lengthwise), Y (transverse), and Z (height) directions with respect to the workpiece 3; and other components, as shown in FIG. 1. The torch movement devices 4, 6, 8 are composed of, e.g., a movement truck 4 that can move in a reciprocating fashion in the X direction adjacent to the table 2; an arm 6 extending above the table 2 from the movement truck 4 in the Y direction; a carriage 8 that movably supports the plasma torch 10 in a reciprocating fashion in the Z direction and that can move on the arm 6 in a reciprocating fashion in the Y direction; and the like. A control device and an arc power circuit are incorporated inside the movement truck 4 and/or the table 2 for generating a pilot arc or a plasma arc with the plasma torch 10 and controlling the arcs. Although not shown in the drawings, also provided are a gas system for feeding plasma gas, assist gas, or other gas to the plasma torch 10; a cooling system for feeding coolant (typically cooling water) to the plasma torch 10; and other components.

Figure 2:
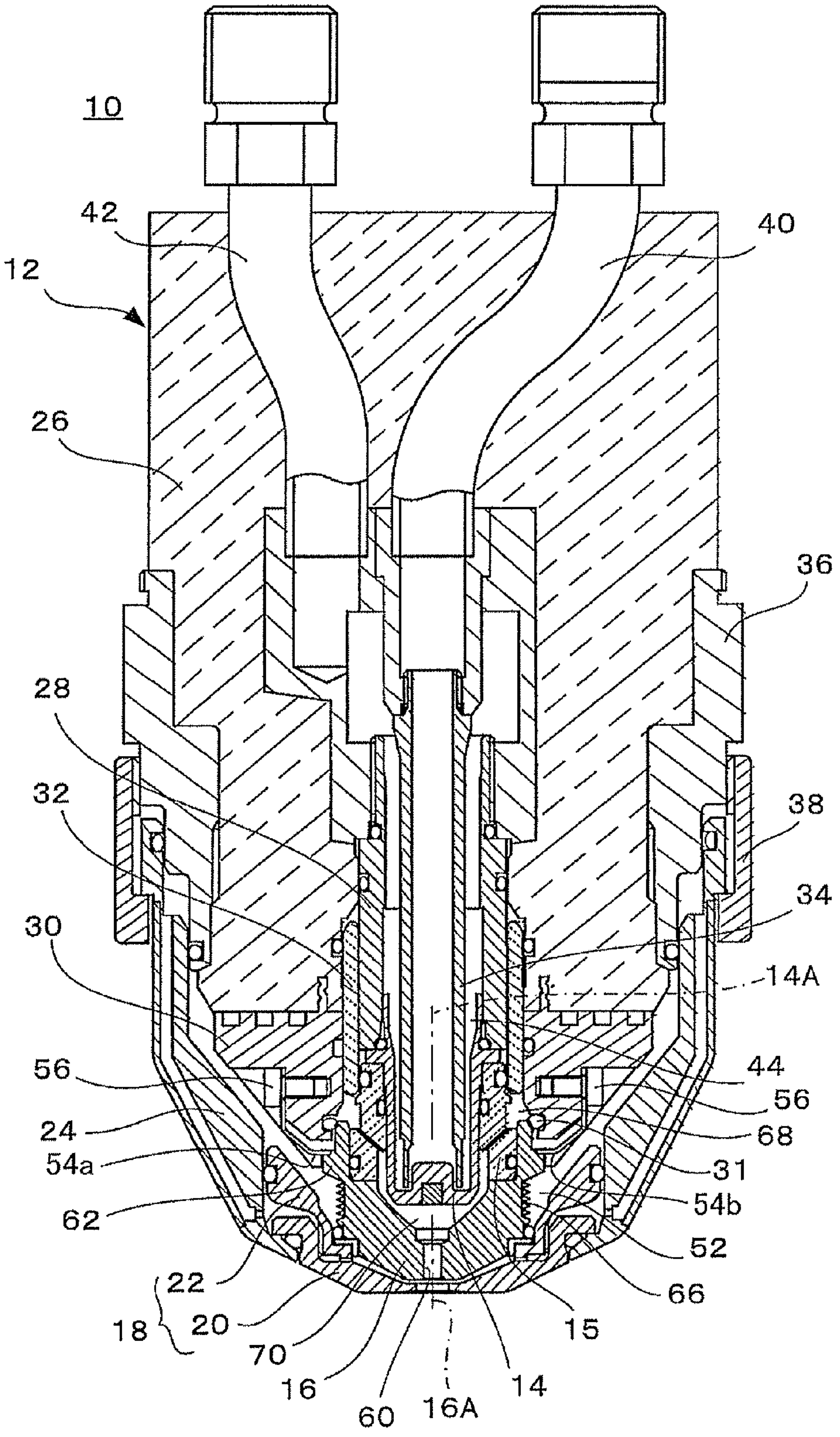
FIG. 2 is a cross-sectional view along the center axis of an embodiment of the plasma torch according to the present invention.
Figure 3:
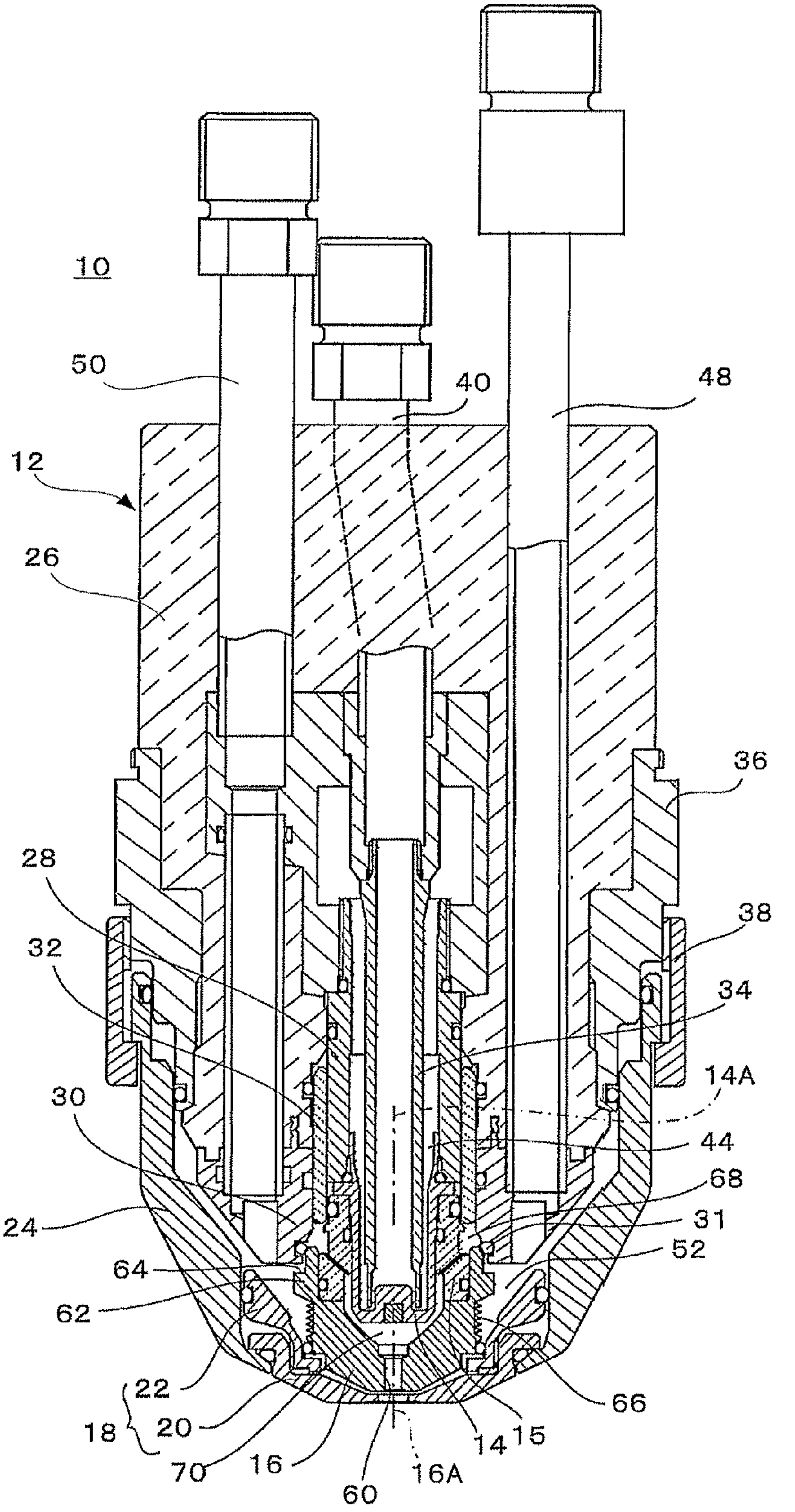
FIG. 3 is a cross-sectional view at another angle along the center axis of the plasma torch.

FIGS. 2 and 3 are cross-sectional views along the center axis of an embodiment of the plasma torch used in the plasma-working machine shown in FIG. 1. In FIGS. 2 and 3, the angle of the cutting surface about the center axis is different. The plasma torch 10 has a torch main unit 12 and a plurality of components detachably mounted on the torch main unit 12, examples of which include an electrode 14, an insulating swirler 15, a nozzle 16, a shield cap 18 (20, 22), a retainer cap 24, and other components as shown in FIGS. 2 and 3. The torch main unit 12 has a base part 26, an electrode seat 28, a nozzle seat 30 (the nozzle seat member), an insulating sleeve 32, an electrode-cooling pipe 34, a holder 36, a fixed ring 38, an electrode coolant feed pipe 40, an electrode coolant discharge pipe 42, a nozzle coolant feed pipe 48, a nozzle coolant discharge pipe 50, and the like.

In the torch main unit 12, the base part 26 is substantially cylindrical, and the substantially cylindrical electrode seat 28 is mounted on the distal end part of the base part 26. The substantially conical and cylindrical nozzle seat 30 is mounted on the outside of the electrode seat 28 of the distal end part of the base part 26. The insulating sleeve 32 for electrically insulating the electrode seat 28 and the nozzle seat 30 from each other is disposed between the two. The electrode-cooling pipe 34 is secured to the inside of the electrode seat 28. The base part 26, the electrode seat 28, the nozzle seat 30, the insulating sleeve 32, and the electrode-cooling pipe 34 are coaxially arranged.

The substantially cylindrical holder 36 is fitted to the external periphery of the base part 26, and the holder 36 has screw ridges on its external surface. The fixed ring 38 for securing the retainer cap 24 to the torch main unit 12 is mounted on the external periphery of the holder 36. The fixed ring 38 has screw ridges on the inside surface thereof, the screw ridges are threaded together with the screw ridges of the external peripheral surface of the holder 36, and the fixed ring 38 is capable of rotating in relation to the holder 36.

The electrode seat 28 is made of metal and is connected to a terminal for electrode conduction of the arc power circuit described above via electrical wiring (not shown in the drawings) inside the base part 26. The base end part of the electrode 14 is detachably inserted into the distal end part of the electrode seat 28. The electrode 14 is made of metal and has a substantially cylindrical shape closed at the distal end. The electrode seat 28 and the electrode 14 are in close contact, and the two are electrically connected via the contact surfaces of the electrode seat 28 and the electrode 14. When the electrode 14 is mounted on the electrode seat 28, the electrode-cooling pipe 34 enters into the deepest position (the position immediately behind the distal end part of the electrode 14) of the internal space (the cooling water channel for cooling the electrode 14) of the electrode 14.

Figure 4:
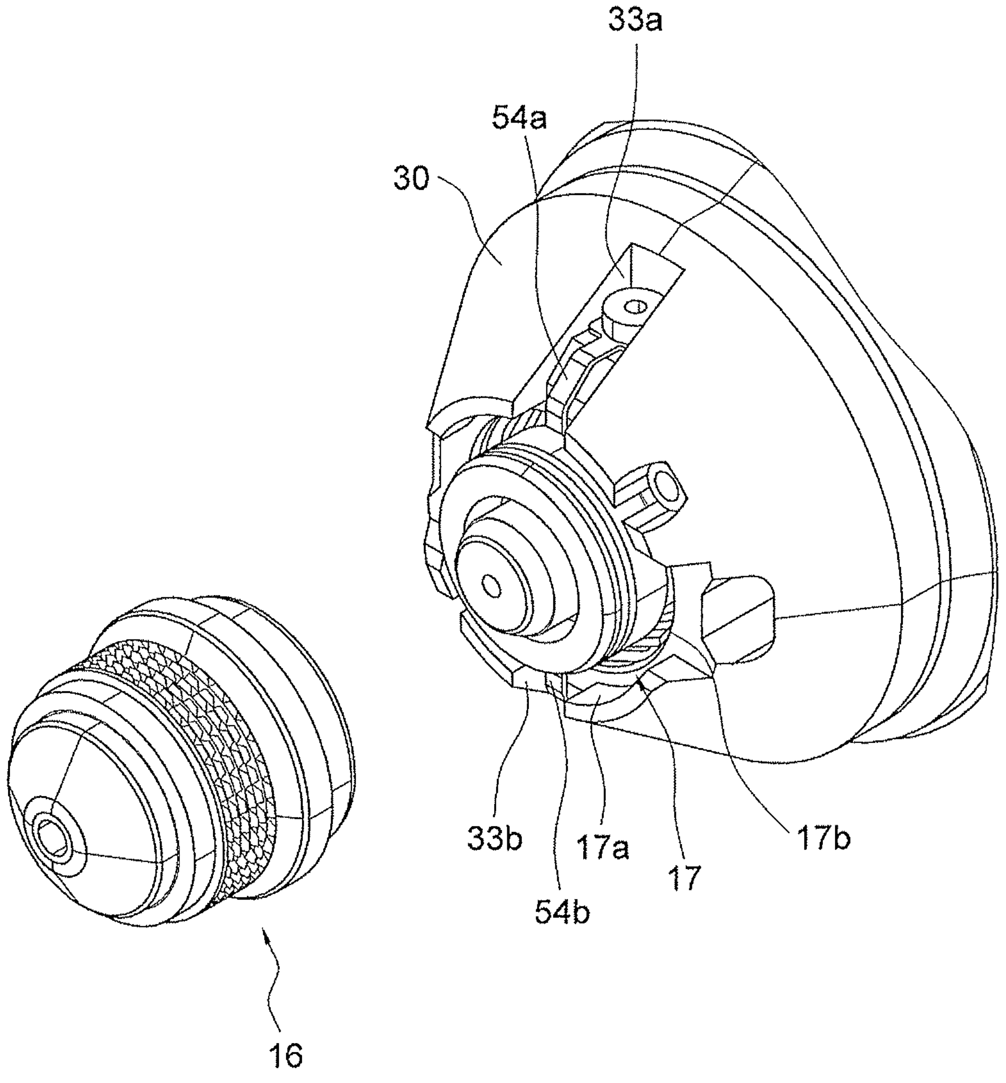
FIG. 4 is an exploded perspective view showing the structure in the vicinity of the nozzle seat of the plasma torch.
Figure 5:
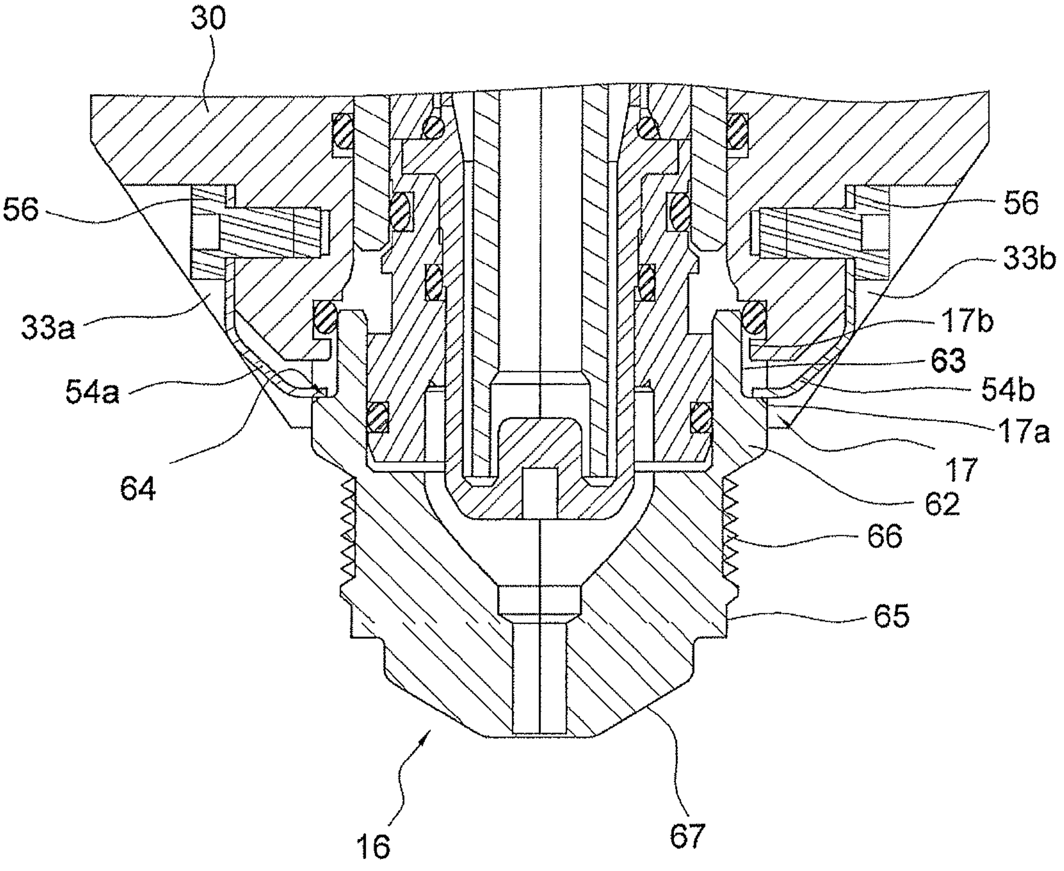
FIG. 5 is an enlarged cross-sectional view of the vicinity of the nozzle seat.
Figure 6:
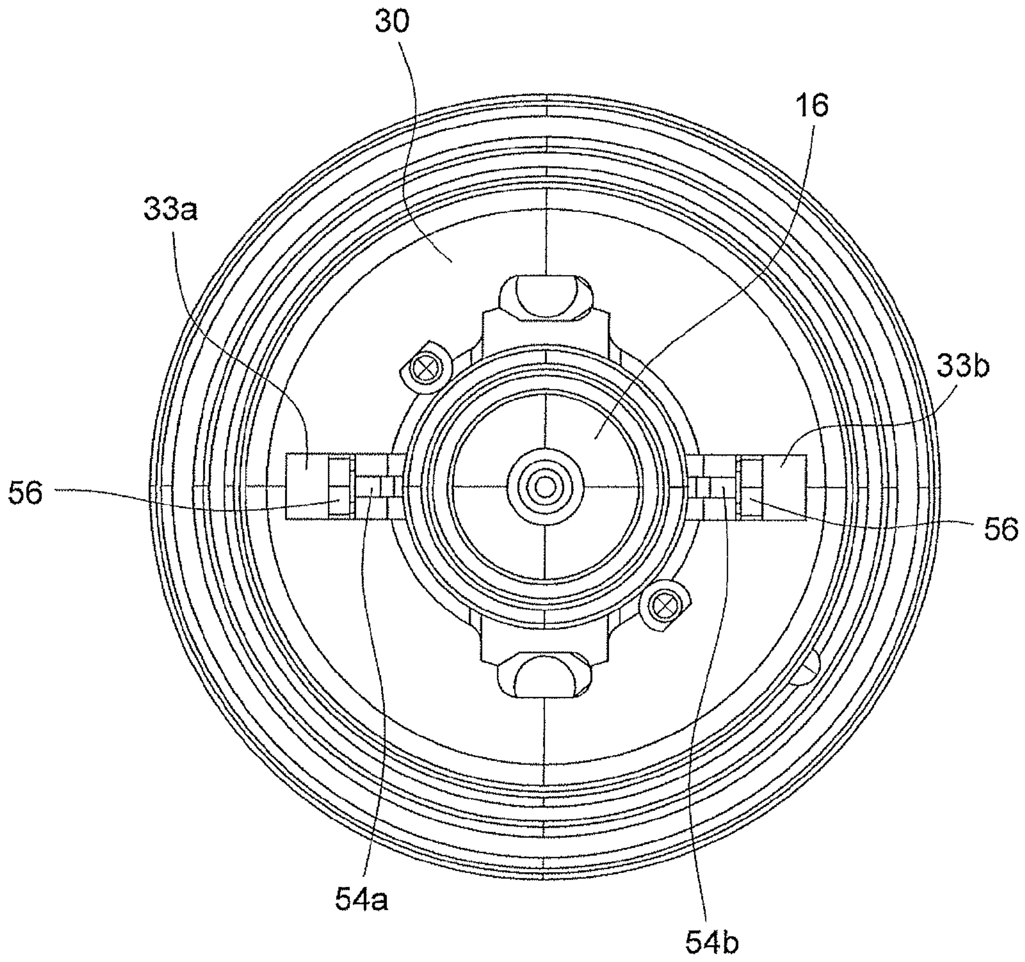
FIG. 6 is a view of the structure of the vicinity of the nozzle seat as seen from the axial direction.

The nozzle seat 30 is made of metal and is connected to the above-described terminal for passing the electric current through the nozzle from the arc power circuit via electrical wiring (not shown in the drawings) inside the base part 26. The base end part of the nozzle 16 is detachably inserted in the distal end part of the nozzle seat 30. Specifically, a hole 17 into which the base end part of the nozzle 16 is inserted is provided in the nozzle seat 30, as shown in FIGS. 4 and 5. FIG. 4 is an exploded perspective view showing the structure of the vicinity of the nozzle seat 30. FIG. 5 is an enlarged cross-sectional view showing the vicinity of the nozzle seat 30. The hole 17 is formed completely through the nozzle seat 30 in the axial direction and has a first hole part 17*a* and a second hole part 17*b*. The first hole part 17*a* is disposed at the distal end part of the nozzle seat 30 and has an inside diameter that is greater than the outside diameter of an outer flange 62 of the nozzle 16 described hereinbelow. The second hole part 17*b* communicates with the first hole part 17*a* at the base end side in the axial direction of the nozzle seat 30, and is arranged coaxially to the first hole part 17*a*. The second hole part 17*b* has an inside diameter that is smaller than the first hole part 17*a* and greater than the outside diameter of a first cylindrical part 63 of the nozzle 16 described hereinbelow. A pair of grooves 33*a*, 33*b* that extends in the radial direction as viewed from the axial direction is provided to the distal end part of the nozzle seat 30, as shown in FIGS. 4 through 6. The pair of grooves 33*a*, 33*b* is disposed facing each other with the first hole part 17*a* disposed therebetween, and is in communication with the first hole part 17*a*. FIG. 6 is a view seen from the distal end side in the axial direction of the nozzle seat 30 in a state in which the nozzle 16 has been mounted.

When the nozzle 16 is mounted on the nozzle seat 30, the center axis 16A of the nozzle 16 and the center axis 14A of the electrode 14 are designed to positionally match each other. The nozzle 16 is made of metal, and has an orifice 60 for discharging a plasma arc in the distal end of the nozzle 16. An O-ring 31 is sandwiched between the inside surface of the distal end part of the nozzle seat 30 and the external surface of the base end part of the nozzle 16 inserted into the nozzle seat 30. The O-ring 31 provides a gas/liquid seal between an internal space (plasma gas channel) 68 of the distal end part of the nozzle seat 30 and an external space (coolant channel for cooling the nozzle 16) 52 of the nozzle 16. A very small gap is provided by the O-ring 31 between the inside surface of the distal end part of the nozzle seat 30 and the external surface of the base end part of the nozzle 16 inserted into the nozzle seat 30, and direct contact can thereby be prevented between the nozzle seat 30 and the nozzle 16. Thus, direct contact between the nozzle seat 30 and the nozzle 16 does not occur. Instead, a plurality of (or one) electric contacts 54*a*, 54*b* (the electric contact portion) mounted on the nozzle seat 30 make contact with the nozzle 16 as described hereinbelow, thereby forming an electroconductive path for the pilot arc in relation to the nozzle 16.

The substantially cylindrical insulating swirler 15 is inserted between the electrode 14 and the nozzle 16. The insulating swirler 15 provides electrical insulation between the electrode 14 and the nozzle 16. The insulating swirler 15 has a plurality of gas holes formed diagonally through the side wall of the insulating swirler 15, which imparts a rotating action for bevel angle control to the plasma gas flow that flows from the plasma gas channel 68 at the distal end part of the nozzle seat 30, through the gas holes, and into a plasma gas channel 70 inside the nozzle 16.

The shield cap 18 for protecting the nozzle 16 is provided outside (below) the distal end part of the nozzle 16 so as to cover the distal end part of the nozzle 16. The shield cap 18 acts to hold and protect the nozzle 16. The shield cap 18 has an outside shield cap 20 and an inside shield cap 22. An assist gas channel for directing the assist gas flow to the periphery of an outlet of the orifice 60 of the nozzle 16 and imparting a rotation for bevel angle control to the assist gas flow is formed between the outside shield cap 20 and the inside shield cap 22. The inner surface of the inside shield cap 22 and the outer surface of the nozzle 16 constitute the coolant channel 52 for cooling the nozzle 16. The inside shield cap 22 is made of a material having good heat conductivity, discharges heat from the outside shield cap 20 to the coolant channel 52, and acts to cool the outside shield cap 20.

The retainer cap 24 constitutes the main part of the outer shell of the distal end portion of the plasma torch 10, the shield cap 18 is held at the distal end part of the retainer cap 24, and the fixed ring 38 is engaged at the base end part of the retainer cap 24. The retainer cap 24 is secured to the holder 36 (torch main unit 12) by fastening the fixed ring 38. An assist gas channel for directing the assist gas flow to the above-described assist gas channel inside the shield cap 18 is present within the wall thickness of the retainer cap 24. The inner surface of the retainer cap 24 and the outer surface of the nozzle seat 30 constitute the coolant channel 52 for cooling the nozzle 16.

The electrode coolant feed pipe 40, the electrode coolant discharge pipe 42, the nozzle coolant feed pipe 48, and the nozzle coolant discharge pipe 50 are inserted inside the base part 26 from the base end surface of the base part 26 of the torch main unit 12. The electrode coolant feed pipe 40 is connected to the electrode-cooling pipe 34, and the electrode coolant discharge pipe 42 is connected to the electrode seat 28, as shown in FIG. 2. The nozzle coolant feed pipe 48 and the nozzle coolant discharge pipe 50 are connected to one end and the other end, respectively, of the coolant channel 52 for cooling the nozzle 16, as shown in FIG. 3.

Coolant is fed from the cooling system described above to the electrode coolant feed pipe 40 at a first flow rate suitable for cooling the electrode 14, and coolant is fed to the nozzle coolant feed pipe 48 at a second flow rate suitable for cooling the nozzle 16. The coolant for cooling the electrode 14 passes from the electrode coolant feed pipe 40 through electrode-cooling pipe 34 and is fed immediately behind the distal end part of the electrode 14 to cool the electrode 14. From that point, the coolant flows along the inner surface of the electrode 14 to further cool the electrode 14, and then passes through the electrode coolant discharge pipe 42 to return to the cooling system described above. The coolant for cooling the nozzle 16 enters from the nozzle coolant feed pipe 48 into the coolant channel 52, flows along the outer surface of the nozzle 16 and inner surface of the shield cap 18, cools the nozzle 16 and the shield cap 18, and then passes through the nozzle coolant discharge pipe 50 to return to the cooling system described above.

Figure 7:
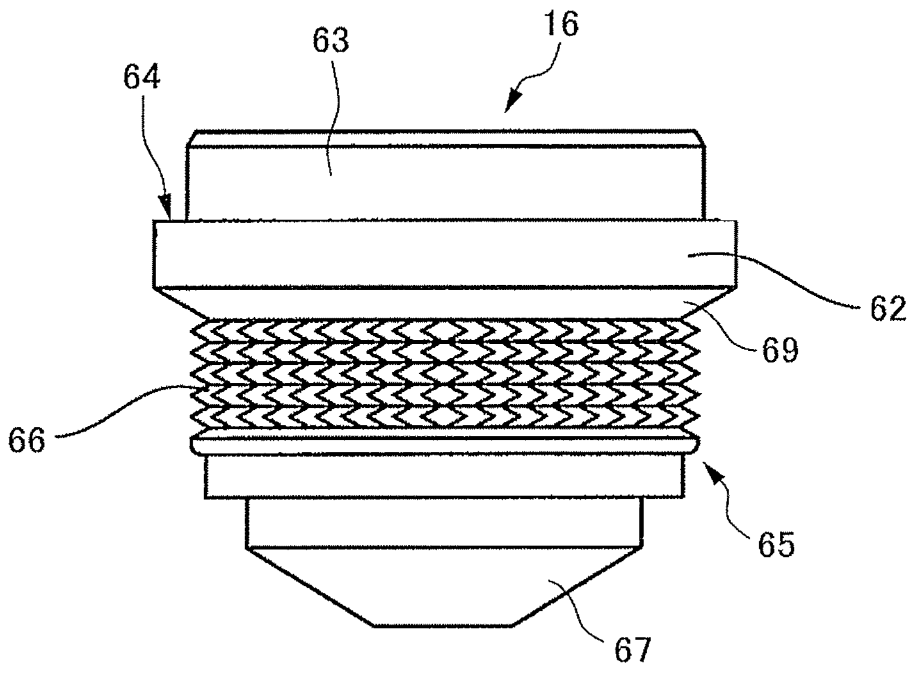
FIG. 7 is a side view of an embodiment of the nozzle according to the present invention.

The nozzle 16 has the first cylindrical part 63, the outer flange 62, a second cylindrical part 65, and a distal end part 67, as shown in FIGS. 5 and 7. The first cylindrical part 63 is positioned on the most base end side of the nozzle 16. The first cylindrical part 63 has a cylindrical shape, and has an outside diameter that is less than the inside diameter of the second hole part 17*b* of the nozzle seat 30 described above. The base end part of the first cylindrical part 63 is chamfered. The outer flange 62 is provided in a position near the base end part on the outer surface facing the coolant channel 52. The outer flange 62 is arranged adjacent to the distal end side of the first cylindrical part 63 in the axial direction and is connected to the first cylindrical part 63. The outer flange 62 has an outside diameter that is greater than the outside diameter of the first cylindrical part 63. The second cylindrical part 65 is arranged adjacent to the distal end side of the outer flange 62 in the axial direction and is connected to the outer flange 62. The second cylindrical part 65 has an outside diameter that is less than the outside diameter of the outer flange 62. A connecting portion 69 between the outer flange 62 and the second cylindrical part 65 has a tapered shape. A knurled pattern is formed on a portion on the base end side of the external peripheral surface of the second cylindrical part 65, and is a concavo-convex part 66 composed of numerous narrow projections. The distal end part 67 is arranged adjacent to the distal end side of the second cylindrical part 65 in the axial direction and is connected to the second cylindrical part 65. The distal end part 67 has a tapered shape in which the distal end side has a narrowing diameter. The outer flange 62 and the concavo-convex part 66 are preferably (but not necessarily required to be) provided across an angular range of substantially the entire periphery (360°) about the center axis 16A of the nozzle 16. One role of the outer flange 62 and the concavo-convex part 66 is to increase the surface area of the nozzle 16 for contact and heat exchange with the coolant to improve the cooling effect of the nozzle 16.

The outer flange 62 of the nozzle 16 furthermore acts to form an electroconductive path for the pilot arc to the nozzle 16. The formation of the electroconductive path for the pilot arc is described in greater detail below.

The outer flange 62 of the nozzle 16 protrudes outward on the outer surface of the nozzle 16, as shown in FIGS. 5 and 7, and provides an electroconductive surface 64 that is oriented so as to face the nozzle seat 30. The electroconductive surface 64 protrudes outward in the radial direction from the external peripheral surface of the first cylindrical part 63. The electroconductive surface 64 is an annular flat surface that surrounds the entire external periphery of the nozzle 16, and is perpendicular to the center axis 16A of the nozzle 16.

A plurality of elastic electric contacts 54*a*, 54*b* made of metal are mounted on the outer surface of the nozzle seat 30 in positions distributed at fixed angle intervals about the center axis 16A. Specifically, the electric contacts 54*a*, 54*b* are mounted on the above-described pair of grooves 33*a*, 33*b*, respectively, and are arranged at 180° intervals. The electric contacts 54*a*, 54*b* are secured and electrically connected to the nozzle seat 30 using, e.g., metal bolts 56. The electric contacts 54*a*, 54*b* extend from the mounting positions on the nozzle seat 30 toward the nozzle 16. In other words, the electric contacts 54*a*, 54*b* protrude from the grooves 33*a*, 33*b* toward the first hole part 17*a*. The electric contact 54*a* is formed in a bent shape in a plurality of locations, and has a base end part 71, an intermediate part 72, and a distal end part 73, as shown in FIG. 7. The base end part 71 extends along the axial direction of the nozzle seat 30. The electric contact 54*a* is secured to the nozzle seat 30 at the base end part 71 and is in a cantilevered state. The intermediate part 72 is connected to the base end part 71 and is arranged with an incline in the axial direction of the nozzle seat 30. The distal end part 73 is connected to the intermediate part 72 and is arranged perpendicular to the axial direction of the nozzle seat 30. The electric contact 54*b* has the same shape as the electric contact 54*a*. The distance between the distal ends of the electric contacts 54*a*, 54*b* is greater than the outside diameter of the first cylindrical part 63 of the nozzle 16 and is less than the outside diameter of the outer flange. Accordingly, the distal end part 73 of the electric contacts 54*a*, 54*b* is in contact with the electroconductive surface 64 of the outer flange 62 of the nozzle 16. The electric contacts 54*a*, 54*b* are pushed and compressed in the direction facing the nozzle seat 30 substantially parallel to the center axis 16A, make reliable contact with the electroconductive surface 64 of the nozzle 16 due to the elastic force generated by the compression, and are pressed in the direction away (the direction pressing outward from the distal end of the nozzle seat 30) from the nozzle seat 30 of the nozzle 16. Therefore, a reliable electrical connection is provided between the nozzle 16 and the electric contacts 54*a*, 54*b* even when the modulus of elasticity of the electric contacts 54*a*, 54*b* is not particularly high. In this manner, the nozzle seat 30 and the electric contacts 54*a*, 54*b* form an electroconductive path for the pilot arc to the nozzle 16.

As described above, a very small gap is provided between the nozzle seat 30 and the nozzle 16, and the two 30, 16 do not make direct contact. Therefore, the electroconductive path for the pilot arc to the nozzle 16 is provided solely by contact between the electroconductive surface 64 of the nozzle 16 and the electric contacts 54*a*, 54*b*. The electroconductive surface 64 of the nozzle 16 and the electric contacts 54*a*, 54*b* are both inside the coolant channel 52, as shown in FIG. 2. The electric contacts 54*a*, 54*b* can be removed from the nozzle seat 30 by loosening the metal bolts 56. Insulation breakdown substantially does not occur between the nozzle seat 30 and the nozzle 16 because the nozzle seat 30 and the nozzle 16 are not in direct contact even in the case that there is poor contact at the contact locations between the electroconductive surface 64 and the electric contacts 54*a*, 54*b*. Since the contact locations between the electroconductive surface 64 and the electric contacts 54*a*, 54*b* are immersed in the coolant, sparks due to breakdown of the electrical insulation are not readily generated even when there is poor contact at the contact locations. Even were sparks to be generated at the contact locations between the electroconductive surface 64 and the electric contacts 54*a*, 54*b*, the damage is less because the locations are in the coolant rather than in gas, and the parts that would be damaged are only the nozzle 16 and the electric contacts 54*a*, 54*b*. The nozzle 16 is an expendable part that is replaced sooner or later. If a nozzle 16 with a far-off replacement date is damaged, an undamaged location of the electroconductive surface 64 can be newly used as the contact location with the electric contacts 54*a*, 54*b* by rotating the nozzle 16 at a small angle about the center axis 16A. The electric contacts 54*a*, 54*b* are merely inexpensive metal plates, and it is possible to remove only electric contacts from the nozzle seat 30 and replace the electric contacts. Therefore, the torch main unit 12 does not incur particularly great damage even if sparks are generated due to poor contact, and the torch main unit can be readily restored at low cost.

Automatic positioning is carried out so that the position of the center axis 16A of the nozzle 16 and the position of the center axis 14A of the electrode 14 match due to the effect of the insulating swirler 15 sandwiched between the nozzle 16 and the electrode 14, the O-ring sandwiched between the insulating swirler 15 and the electrode 14, and the O-ring sandwiched between the insulating swirler 15 and the nozzle 16. The formation of the electroconductive path by the electric contacts 54*a*, 54*b* does not particularly interference with the positional adjustments of the center axis of the nozzle 16 and the electrode 14. In other words, the direction of the pressing force applied from the electric contacts 54*a*, 54*b* to the nozzle 16 is substantially parallel to the center axis 16A of the nozzle 16. The component of the pressing force applied from the electric contacts 54*a*, 54*b* to the nozzle 16 in the direction perpendicular to the center axis 16A is substantially near zero. Therefore, the pressing force from the electric contacts 54*a*, 54*b* does not cause the center axis 16A of the nozzle 16 to become laterally displaced.

When the electrode 14, the nozzle 16, or another expendable part is to be replaced, the retainer cap 24 is first removed from the torch main unit 12, and the nozzle 16 is thereafter pulled away from the nozzle seat 30 substantially parallel to the center axis 16A of the nozzle 16, whereby the nozzle 16 is removed from the nozzle seat 30. At this point, the pressing effect aids the removal of the nozzle 16 because the electric contacts 54*a*, 54*b* push the nozzle 16 from the nozzle seat 30. In some cases, when the user has removed the retainer cap 24, the user is not required to pull on the nozzle 16 because the nozzle 16 naturally dislodges from the nozzle seat 30 in a state in which the nozzle 16 is held inside the retainer cap 24 (together with the shield cap 18) due to gravity (because the distal end of the plasma torch 10 constantly faces downward) and the pressing effect of the electric contacts 54*a*, 54*b*. Thus, the electric contacts 54*a*, 54*b* is readily removed from the nozzle seat 30.

When the nozzle 16 is reattached to the nozzle seat 30, the nozzle 16 is pressed into the distal end part of the nozzle seat 30 substantially parallel to the center axis 16A of the nozzle 16, and the retainer cap 24 is then mounted on the torch main unit 12 to secure the nozzle 16 and the shield cap 18. Alternatively, the nozzle 16 is pressed into the distal end part of the nozzle seat 30 substantially parallel to the center axis 16A in a state in which the nozzle 16 is held inside the retainer cap 24 (together with the shield cap 18), and is mounted on the torch main unit 12 together with the retainer cap 24. In either case, when the nozzle 16 is pressed into the nozzle seat 30, the nozzle 16 and the electric contacts 54*a*, 54*b* come into contact, and the two components 54, 64 press against each other in the opposite directions substantially parallel to the center axis 16A of the nozzle 16. An electrical connection is thereby reliably formed between the nozzle 16 and the electric contacts 54*a*, 54*b*. However, the electric contacts 54*a*, 54*b* do not press against the nozzle 16 in the direction perpendicular to the center axis 16A of the nozzle 16. Therefore, the electric contacts 54*a*, 54*b* not cause the position of the center axis 16A of the nozzle 16 to become laterally displaced from the position of the center axis 14A of the electrode 14.

When the nozzle 16 is pressed into the nozzle seat 30, the electrical contact between the nozzle 16 and the electric contacts 54*a*, 54*b* is always provided no matter the position of the nozzle 16 in the rotational direction about the center axis 16A of the nozzle 16. This is because the electroconductive surface 64 for ensuring contact with the electric contacts 54*a*, 54*b* is provided to the entire periphery of the nozzle 16.

In the embodiment shown in the drawings, the electroconductive surface 64 of the nozzle 16 is a flat surface that is perpendicular to the center axis 16A of the nozzle 16, but this is merely an example and such a configuration is not necessarily required. The electroconductive surface 64 may be inclined at a slight angle from the direction perpendicular to the center axis 16A, or may be a curved surface, as long as the above-described electrical contact between the electroconductive surface 64 and the electric contacts 54*a*, 54*b* can be assured. Also, in the present embodiment, the electroconductive surface 64 (being provided by the outer flange 62) is present across substantially the entire periphery on the external peripheral surface of the nozzle 16, but this is merely an example and such a configuration is not necessarily required. A plurality of electroconductive surfaces 64 may be present at distributed positions having a predetermined angle interval about the center axis 16A on the external peripheral surface of the nozzle 16 as long as the above-described electrical contact between the electroconductive surface 64 and the electric contacts 54*a*, 54*b* can be assured.

An embodiment of the present invention was described above, but the embodiment is an example for describing the present invention, and the scope of the present invention is not limited to the present embodiment. The present invention can be applied in various other modes without departing from the scope of thereof.

For example, in the embodiment described above, the electroconductive surface 64 of the nozzle 16 is a single annular flat surface that encompasses the entire external periphery of the nozzle 16 and is perpendicular to the center axis 16A of the nozzle, but this is merely an example and such a configuration is not necessarily required. In a modified example, it is possible to provide a plurality of electroconductive surfaces to the positions distributed at predetermined angle intervals about the center axis 16A on the surface of the nozzle 16. Also, the electroconductive surface may be provided to a surface other than the outer surface of the nozzle (e.g., the inner surface, the base end surface, or the like). Also, the electroconductive surface may be a curved surface, or the electroconductive surface may be slightly inclined from the direction perpendicular to the center axis 16A of the nozzle, as long as the contact between the electroconductive surface and the electric contacts is assured.

In the embodiment described above, a plurality of electric contacts 54*a*, 54*b* were mounted in positions distributed at predetermined angle intervals about the center axis 16A on the outer surface of the nozzle seat 30, but this is merely an example and such a configuration is not necessarily required. In a modified example, a single annular electric contact may be provided on the nozzle seat 30 across the entire angular range about the center axis 16A of the nozzle 16, for example, and the annular electric contact may make contact with the electroconductive surface 64 of the nozzle 16. In another modified example, it is possible to provide one or a plurality of electric contacts on a component other than the nozzle seat 30 inside the torch main unit 12, and the component and the electric contacts may provide an electroconductive path for the pilot arc.

The plasma torch of the illustrated embodiments has an effect in which the electroconductive path for the pilot arc to the nozzle can be more reliably formed.

The invention claimed is:

1. A plasma torch comprising:

a torch main unit having a nozzle seat member;

a nozzle mounted on the nozzle seat member; and a coolant circuit for cooling the nozzle, the coolant circuit including a coolant feed pipe arranged to feed a coolant from a cooling system to the plasma torch, a coolant discharge pipe arranged to discharge the coolant from the plasma torch to the cooling system, and a coolant channel formed between the coolant feed pipe and the coolant discharge pipe, the nozzle being arranged to move toward the nozzle seat member or away from the nozzle seat member in a direction substantially parallel to a center axis of the nozzle when the nozzle is mounted on or removed from the nozzle seat member, the nozzle having an electroconductive surface facing the nozzle seat member;

the torch main unit having an elastic electric contact portion contacting with the electroconductive surface of the nozzle to form an electroconductive path for a pilot arc to the nozzle, the torch main unit and the nozzle being arranged such that the electroconductive surface of the nozzle presses the electric contact portion of the torch main unit in the direction substantially parallel to the center axis when the nozzle is moved toward the nozzle seat member in order to mount the nozzle on the nozzle seat member, a contacting location between the electroconductive surface of the nozzle and an electroconductive surface of the electric contact portion of the torch main unit being disposed inside the coolant channel.

2. The plasma torch according to claim 1, wherein the electric contact portion is arranged to be removable from the torch main unit.

3. The plasma torch according to claim 1, wherein the nozzle has an outer flange provided substantially about an entire periphery of the center axis on an external surface of the nozzle with the outer flange including the electroconductive surface.

4. The plasma torch according to claim 1, wherein the electroconductive surface of the nozzle and the electric contact portion forms an exclusive electrical connection between the electroconductive path and the nozzle.

5. A plasma-working machine comprising:

the plasma torch according to claim 1;

a table on which a workpiece is disposed; and a torch movement device configured and arranged to move the plasma torch in relation to the workpiece on the table.

6. A nozzle adapted to be installed in a plasma torch having a torch main unit with a nozzle seat member on which the nozzle is mounted, and elastic electric contact portion for forming an electroconductive path for a pilot arc to the nozzle, the nozzle comprising:

an electroconductive surface arranged to face the nozzle seat member and to contact the electric contact portion of the torch main unit when the nozzle is mounted on the nozzle seat member, the electroconductive surface being arranged to press the electric contact portion of the torch main unit in a direction substantially parallel to a center axis of the nozzle when the nozzle is moved toward the nozzle seat in the direction substantially parallel to the center axis in order to mount the nozzle on the nozzle seat member; and a first cylindrical part disposed between a base end of the nozzle and the electroconductive surface, an external peripheral surface of the first cylindrical part adjacent to the base end including a sealing member contacting surface arranged to contact a sealing member that is disposed between the external peripheral surface of the first cylindrical part and the nozzle seat member when the nozzle is mounted on the nozzle seat member.

7. The nozzle according to claim 6, wherein the sealing member is an O-ring.

8. A nozzle adapted to be installed in a plasma torch, the nozzle comprising:

a first cylindrical part including a sealing member contacting surface disposed on an external peripheral surface in a base end part of the first cylindrical part, the sealing member contacting surface being arranged to contact a sealing member for providing a gas/liquid seal between a plasma gas channel and a coolant channel formed in the plasma torch;

an outer flange having an electroconductive surface protruding from the external peripheral surface of the first cylindrical part in a radial direction, the outer flange being disposed adjacent to the first cylindrical part in an axial direction and having a greater outer diameter than the first cylindrical part;

a second cylindrical part disposed adjacent to the outer flange with the outer flange being disposed between the first cylindrical part and the second cylindrical part in the axial direction, the second cylindrical part having a smaller outer diameter than the outer flange;

a distal end part disposed adjacent to the second. cylindrical part with the second cylindrical part being disposed between the outer flange and the distal end part in the axial direction, the distal end part having a tapered shape in which a distal end side has a narrowing diameter; and an orifice formed in the distal end part.

9. The nozzle according to claim 8, wherein the sealing member is an O-ring.

10. The nozzle according to claim 8, wherein the electroconductive surface is disposed inside the coolant channel when the nozzle is installed in the plasma torch.

11. The nozzle according to claim 10, wherein the outer flange and an external peripheral surface of the second cylindrical part are disposed inside the coolant channel when the nozzle is installed in the plasma torch.

12. The nozzle according to claim 11, wherein the external peripheral surface of the second cylindrical part includes a knurled pattern.

* * * * *